(12) United States Patent
Holweger et al.

(10) Patent No.: US 10,481,042 B2
(45) Date of Patent: Nov. 19, 2019

(54) METHOD AND SYSTEM FOR MONITORING THE FUNCTION OF A LUBRICATED MACHINE ELEMENT

(71) Applicant: Schaeffler Technologies AG & Co. KG, Herzogenaurach (DE)

(72) Inventors: Walter Holweger, Epfendorf (DE);
Marcus Wolf, Herzogenaurach (DE);
Matthias Goss, Adelsdorf (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 241 days.

(21) Appl. No.: 15/129,227

(22) PCT Filed: Mar. 26, 2014

(86) PCT No.: PCT/DE2014/200142
§ 371 (c)(1),
(2) Date: Sep. 26, 2016

(87) PCT Pub. No.: WO2015/144106
PCT Pub. Date: Oct. 1, 2015

(65) Prior Publication Data
US 2017/0205313 A1    Jul. 20, 2017

(51) Int. Cl.
*G01M 13/04* (2019.01)
*G05B 23/02* (2006.01)
*G06Q 10/00* (2012.01)

(52) U.S. Cl.
CPC ......... *G01M 13/04* (2013.01); *G05B 23/0224* (2013.01); *G06Q 10/20* (2013.01)

(58) Field of Classification Search
CPC .............................. G01M 13/04; G06Q 10/20
USPC .......................................................... 702/35
See application file for complete search history.

(56) References Cited

U.S. PATENT DOCUMENTS

| | | | | |
|---|---|---|---|---|
| 3,981,584 A | * | 9/1976 | Guymer | F01M 11/10 356/70 |
| 5,517,427 A | * | 5/1996 | Joyce | G01N 33/2858 250/301 |
| 5,817,928 A | * | 10/1998 | Garvey, III | G01N 33/2888 73/53.05 |

(Continued)

FOREIGN PATENT DOCUMENTS

| CN | 101432403 A | 5/2009 |
|---|---|---|
| CN | 101760286 A | 6/2010 |

(Continued)

*Primary Examiner* — Ricky Ngon
(74) *Attorney, Agent, or Firm* — Volpe and Koenig, P.C.

(57) ABSTRACT

The invention relates to a method for monitoring the function of a machine element lubricated by a lubricant. The method includes receiving measured values concerning the lubricant, determining a current chemical composition of the lubricant on the basis of the measured values, comparing the current chemical composition with chemical compositions known in advance, which are stored in a database, wherein function failure tendency values for the use of lubricants having the chemical compositions known in advance in connection with machine elements composed of materials known in advance are stored in the database, identifying a function failure tendency value on the basis of the comparison step, and outputting the function failure tendency value.

10 Claims, 4 Drawing Sheets

(56) References Cited

U.S. PATENT DOCUMENTS

| | | | | |
|---|---|---|---|---|
| 5,982,847 A * | 11/1999 | Nelson | ............... | G01N 33/2858 378/45 |
| 6,643,570 B2 * | 11/2003 | Bangert | ................ | G06Q 10/06 701/32.1 |
| 6,859,517 B2 * | 2/2005 | Wilson | ................ | G01N 23/223 378/44 |
| 7,184,515 B2 * | 2/2007 | Wilson | ................ | G01N 23/223 378/44 |
| 7,581,434 B1 * | 9/2009 | Discenzo | ........... | G01N 33/2888 73/53.01 |
| 8,676,436 B2 * | 3/2014 | Raimarckers | ......... | F01D 21/003 701/29.5 |
| 2003/0052697 A1 * | 3/2003 | James | ................ | G01R 31/005 324/555 |
| 2004/0213373 A1 | 10/2004 | Wilson et al. | | |
| 2005/0114088 A1 * | 5/2005 | Gorden | ................... | F02D 41/22 702/185 |
| 2006/0067465 A1 | 3/2006 | Wilson | | |
| 2006/0263604 A1 | 11/2006 | Martin et al. | | |
| 2009/0069204 A1 | 3/2009 | Kamimura et al. | | |
| 2009/0186783 A1 | 7/2009 | Martin et al. | | |
| 2009/0240640 A1 * | 9/2009 | Blain | ................... | G01N 17/043 706/12 |
| 2010/0036619 A1 * | 2/2010 | Bolt | ................... | G01N 33/2888 702/50 |
| 2010/0076693 A1 * | 3/2010 | Liang | ................ | G05B 23/0229 702/22 |
| 2011/0125475 A1 * | 5/2011 | Lugt | .................... | G01M 13/04 703/7 |
| 2011/0267603 A1 * | 11/2011 | Shaw | ................... | G01N 21/431 356/128 |
| 2012/0150491 A1 * | 6/2012 | Shi | ..................... | G05B 23/0235 702/184 |
| 2013/0197830 A1 * | 8/2013 | Dvorak | ................... | G06Q 10/20 702/46 |
| 2014/0121994 A1 * | 5/2014 | Jean | .................... | G01N 33/2858 702/27 |

FOREIGN PATENT DOCUMENTS

| | | |
|---|---|---|
| DE | 102007055575 | 6/2009 |
| EP | 2022840 | 2/2009 |
| EP | 2123779 | 11/2009 |
| EP | 2573195 | 3/2013 |
| WO | 2005035702 | 4/2005 |
| WO | 2007010845 | 1/2007 |
| WO | 2012022501 | 2/2012 |

* cited by examiner

METHOD AND SYSTEM FOR MONITORING THE FUNCTION OF A LUBRICATED MACHINE ELEMENT

FIELD OF THE INVENTION

The present invention relates to the monitoring of the functionality of lubricated machine elements. In particular, the invention relates to a method and system for monitoring the function of bearings with respect to "white etching cracks."

BACKGROUND

Lubricated contacts in technical systems frequently suffer damage due to material fatigue. This can lead to the failure of the entire technical system.

One form of material fatigue is so-called "white etching cracks" (shortened to WEC below). Here, in the contact area of machine elements, for example, when machine elements roll or slide over each other, cracks are created and spread on and under the material surface. In roller bearings, for example, WECs in the rolling contact can occur on or near the raceway surface and can grow under rolling loading as partially branching fatigue cracks into the depth of the material. In practice, the appearance of such WECs leads to the result that large roller bearings that are installed, for example, in wind turbines, in individual cases fail long before their expected statistical service life. The spontaneous and unpredictable occurrence of WECs is associated with high failure and repair costs. WECs are also called "white structured flaking" (WSF).

The cause of the WEC damage mechanism is not conclusively known according to the current state of knowledge. Material solutions and processing methods that largely prevent WECs are known. These solutions are expensive and therefore rarely used in comparison with standard materials and methods.

In DE102007055575A1 it is proposed to combat the occurrence of WECs by generating internal compressive stresses in the area of the raceways. Such internal compressive stresses can be generated by a material-ablating processing method.

In EP2123779A1, for increasing the fatigue strength and for reducing the risk of the occurrence of WECs it is proposed to produce raceways and/or roller elements from a hardened steel with a carbon percentage between 0.4 and 0.8 weight percent.

In EP2573195A1, for increasing the robustness relative to WECs, it is proposed to produce the surface of a roller element or a raceway from a modified material, wherein the roller bearing is exposed for a certain period of time to an increased temperature, while the bearing surface is in contact with a chemical additive.

It is further known that WEC-conditional fatigue damage of lubricated machine elements is associated with the lubricant being used. Therefore, for example, in WO2012/022501A1, WO2007/010845A1, EP2022840A2, US2009/0069204A1, WO2005/035702A1, and Ye, et al., Chem. Commun. 2001, 2244-2245, lubricant solutions with ionic fluid are proposed.

The chemical composition of the lubricant, however, changes during the course of the operation of the lubricated machine element. Therefore, lubricant samples that are typical in practice are taken and sent to a laboratory for study. Based on the study results, it is indicated whether the examined chemical composition of the lubricant is already critical. In the presence of a critical lubricant composition, one possible action is to flush the bearing and replace the lubricant.

The process of laboratory analysis is lengthy, wherein, under some circumstances, a quick-enough response is not possible and fatigue damage can nevertheless occur within the analysis interval. Furthermore, it is not possible to determine a WEC failure tendency, that is, a likelihood for the appearance of WECs. Frequent and regular maintenance, for example, in the form of a flushing of lubricated machine elements, however, under some circumstances also leads to the operational failure of the technical system and is thus expensive.

SUMMARY

The invention is based on the knowledge that for a certain concentration ratio of the lubricant of lubricated machine elements, a service life minimum up to an appearance of WEC damage is to be observed. The lubricant composition of a lubricated machine element in operation changes over time. By adding lubricant additives or the reactive change of the lubricant composition in order to maintain the "WEC-optimal" concentration ratio specified by the system and/or lubricant manufacturer, the operating service life of a lubricated machine element can be improved.

Therefore, to enable responsive maintenance in real-time it is necessary to disclose a method and a system that enables a monitoring of the chemical composition of the lubricant of a lubricated machine element and thus can indicate the function failure tendency for a certain lubricant composition in real-time. The monitoring should be possible both in advance before startup and also during operation by online monitoring or by taking lubricant samples during operation.

This technical problem is solved according to the invention by the technical features of the independent claims in the form of a method, a computer program product, a client system, a server system, and a system comprising a client and server system, which are implemented, at least in part, in a computer.

In one embodiment, the method according to the invention for monitoring the function of a machine element lubricated with a lubricant comprises the receiving of measured values concerning the lubricant and the determination of a current chemical composition of the lubricant based on the measured values.

The determination of a chemical composition of lubricant can be carried out, for example, by spectroscopy.

The method according to the invention further comprises the comparison of the current chemical composition with previously known chemical compositions that are stored in a database. Function failure tendency values for the use of lubricants with the previously known chemical compositions in connection with machine elements from previously known materials can also be stored in the database.

Thus, data about chemical compositions of typical lubricants for certain lubricated machine elements can be stored in the database. The use of a certain lubricant is usually dependent on the application, for example, the application in wind turbines, and the present material. For such applications and boundary conditions, the chemical compositions of the lubricant are often defined by the system and/or lubricant manufacturers or also specified in standards and service life minimum values while maintaining the specified chemical composition are known. Thus there is an optimum function failure tendency value that marks a WEC damage event as unlikely.

In addition, the database can contain empirical data about WEC fatigue events of lubricated machine elements. For such a WEC fatigue event, the chemical composition of the lubricant being used at the time of the event, as well as the application and/or the material, are known.

Thus, a current, determined chemical composition of a lubricant can be compared with the known chemical compositions in the database. The differences between the chemical compositions of the defined lubricants and/or the manufacturer lubricants compared with the lubricants in which the WEC damage event has occurred after a certain operating time can be used for defining values of risk with respect to a function failure due to WEC.

The method according to the invention further comprises the identification of a function failure tendency value based on the comparison step. The function failure tendency value for the lubricated machine element can be identified based on the defined values of risk, that is, dependent on how the current chemical composition compares with the known chemical compositions in the database.

The method according to the invention further comprises the output of the function failure tendency value of the lubricated machine element. The output can be, for example, the transmission of the function failure tendency value via a data connection to the operator of the system with the lubricated machine element. Alternatively or additionally, the display of the function failure tendency value could be realized on a display device such as a screen. If the function failure tendency value has, for example, a high likelihood for the occurrence of a WEC damage event, the operator of a system with the lubricated machine element can replace the lubricant by new lubricant as a precaution. One advantage here is that the operator can wait with the cost-intensive flushing until the function failure tendency value indicates this. Therefore, it is possible to keep the system in operation as long as possible and thus optimize the total running life.

In another embodiment, the method according to the invention comprises the generation of a time sequence based on the multiple identified function failure tendency values. If the time sequence approaches a certain threshold, the output of a warning can be carried out. An output of the warning can take place, for example, the same was as for the output of the identified function failure tendency value. Furthermore, the method according to the invention can comprise the storage of multiple identified function failure tendency values on whose basis the time sequence is generated.

In another embodiment, the approaching of the time sequence to the certain threshold is a characteristic curve. Such a characteristic curve based on the time sequence of the multiple function failure tendency values can compensate for anomalies under the multiple identified function failure tendency values. Such an anomaly can occur, for example, when the measured values are defective or not representative for identifying a function failure tendency value. Measured values can be non-representative in individual cases, because the lubricant composition can be different at different points of the lubricated machine element. Therefore, it is possible that the repeated recording of measured values at, for example, the same measuring location, also has locally limited and essentially non-critical lubricant compositions under some circumstances due to the constantly changing lubricant distribution of the lubricated machine element.

In another embodiment, the method according to the invention comprises the recording of measured values by a measuring system arranged on the lubricated machine element and the sending of the measured values via a data connection. This enables a continuous monitoring of the lubricated machine element, for example, during operation, that is, online monitoring.

In one alternative embodiment, the method according to the invention comprises the recording of measured values by a measuring system formed for taking lubricant samples of the lubricated machine element and the sending of the measured values via a data connection. The operator can thus take, for example, lubricant samples at the lubricated machine element and evaluate them on site in a stationary measuring system.

Both for the online monitoring and also for an alternative taking of lubricant samples, a common advantage is that measured values can be recorded, for example, on site on the lubricated machine element and the data can be sent via a data connection to a locally separated goal and received there. Thus, the manual sending of lubricant samples to a laboratory is eliminated. In other words, the measured values can be recorded on site for a lubricated machine element, for example, directly on wind turbines in wind farms.

It is understood that both for the online monitoring and also for the evaluation of lubricant samples on site, the measured values can be recorded before a system with a lubricated machine element is started up. This can be advantageous, for example, if a used system has been delivered with unsuitable lubricant, such as out-of-date lubricant.

In another embodiment of the method according to the invention, the recording of the measured values comprises a spectroscopy, for example, an infrared spectroscopy or X-ray fluorescence spectroscopy.

In another embodiment, the method according to the invention comprises the calculation of a composition of an additive in order to change the current chemical composition of the lubricant of the lubricated machine element with the addition of the additive so that the function failure tendency value of the changed chemical composition of the lubricant indicates a lower function failure likelihood. In other words, by adding the additive, the current chemical composition can be changed so that it approaches the original chemical composition of the defined lubricant or manufacturer's lubricant. Thus, among other things, the operating time of the system with the lubricated machine element can be prolonged before a flushing or maintenance is to be performed with downtime costs.

In another embodiment, the method according to the invention comprises the output of the calculated composition of the additive. The output can be, for example, the sending of the data on the additive composition via a data connection to the lubricant manufacturer. The lubricant manufacturer can then create a corresponding additive and send this to the operator of the system with the lubricated machine element. It is also conceivable that the operator already has a selection of additives in stock, from which he can then use the matching or the best suitable additive.

Another aspect of the present invention is a computer program product that executes the steps of the computer-implemented method when it is loaded in a memory of a data processing system and is executed by at least one processor of the data processing system.

Additional aspects of the present invention are a client system for recording measured values concerning a lubricant of a lubricated machine element, a server system for monitoring the function of a machine element lubricated with a lubricant, and a system for monitoring the function failure tendency comprising a client system and a server system as described above and below. The system for monitoring the function failure tendency can thus comprise the properties of a client server architecture and/or equivalent computer-to-computer connections, for example, a peer-to-peer architecture.

Additional advantageous embodiments of the present invention are found in the dependent claims.

BRIEF DESCRIPTION OF THE DRAWINGS

An embodiment of the invention is described below with reference to figures.

The figures show drawings that are not to scale. The size ratios of the pictures are to be understood symbolically and are not matched to each other.

DETAILED DESCRIPTION OF THE PREFERRED EMBODIMENTS

Figure 1:
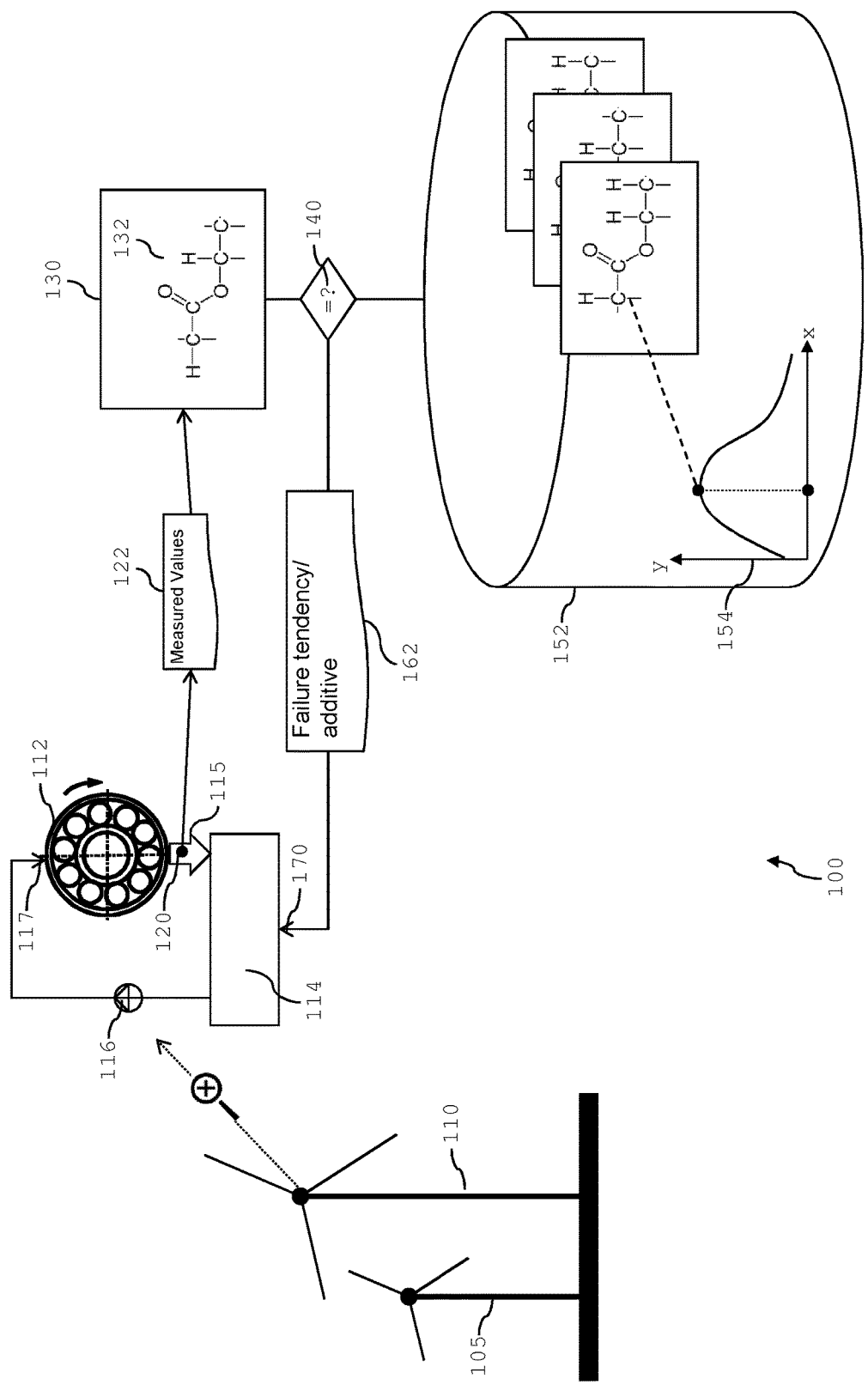
FIG. 1 shows an embodiment of the system according to the invention for monitoring the function failure tendency of a lubricated machine element in an application scenario.

FIG. 1 shows an embodiment of the system according to the invention for monitoring the function failure tendency of a lubricated machine element in an application scenario 100. In the application scenario 100, wind turbines 105, 110 are shown symbolically. Wind turbines 105, 110 comprise large-scale roller bearings. A roller bearing comprises, for example, an inner ring, an outer ring, and intermediate rolling elements, wherein the rolling elements are in rolling contact with the raceway surfaces of the rings. In addition, the contact surfaces are usually lubricated with a corresponding lubricant. In application scenario 100, a roller bearing is shown enlarged.

The following description of the drawings refers to an example of a roller bearing with the lubricated machine element 112. The lubricated machine element can also be, in a different example, only the inner ring that is exposed to a rolling load by rolling elements. A lubricated machine element according to the invention, however, could also be any other arrangement in which at least two machine elements are located in a lubricated friction or rolling contact.

FIG. 1 further illustrates a lubricant circuit 116. The lubricant circuit 116 comprises a lubricant return 115 and a lubricant feed 117, as well as the lubricant reservoir 114. The lubricant circuit 116 provides the lubricated machine element 112 with lubricant via the lubricant feed 117 and lubricant return 115. In addition, a sensor that supplies data for a spectroscopy, for example, for an infrared spectroscopy or X-ray fluorescence spectroscopy, is arranged on the lubricant return 115. The sensor data is further processed by a client system 120 in order to record actual measured values 122 at a time point t_n about the lubricant present in the lubricant circuit 116.

Below, states of the lubricant composition or the chemical composition of the lubricant are different at the following time points t:

t_0: optimum state of the lubricant composition (for example, at the time of delivery)

t_n: current state of the lubricant composition (for example, during the operation of the system)

t_(n+1): current state of the lubricant composition after the time point t_n (for example, during the operation of the system)

t_Z: states of lubricant compositions at time points from the set Z at which a WEC damage event has occurred in a known lubricated machine element.

Measured values 122 are then transmitted to a server system 130. The transmission can be carried out with an arbitrary data connection. The server system 130 determines the chemical composition 132 of the lubricant at time t_n. The chemical composition 132 is then compared with the chemical compositions that are stored in database 152.

The database 152 comprises both data about the chemical composition of the lubricant at time t_0 and also chemical compositions of the lubricant at time points t_Z. By comparing the chemical composition 132 at time t_n with the data in the database 152, a function failure tendency value 162 for the lubricated machine element 112 can be determined.

The determination of the function failure tendency value 162 is possible because the database 152 comprises likelihood values 154 for the stored data on the chemical compositions. The likelihood values 154 provide a statement on the occurrence of WEC damage that applies in the presence of a certain chemical relationship, for example, the ratio of phosphorous to calcium, in the chemical composition 132. In the plot 154, the x-axis shows the ratio of chemical elements in a certain chemical composition and the associated failure risk is indicated on the y-axis. Thus, a current function failure tendency value 162 can be determined from this data.

The current function failure tendency value 162 is then output and transmitted, for example, to the operator of the wind turbines 105, 110. If the function failure tendency value 162 indicates a high risk for the occurrence of a WEC damage event, the lubricant circuit can be flushed 170 in order to restore the optimum lubricant composition at the time t_0 as much as possible. Alternatively, for the determination of the function failure tendency value, the composition of an additive 162 can be calculated that changes the chemical composition of the lubricant at time t_n so that an improved function failure tendency value occurs. The additive 162 can be fed 170 to the lubricant circuit 116.

According to the invention, the determination of the function failure tendency value 162 can be performed continuously for monitoring the lubricated machine element 112 at later time points t_(n+1). In such a case, a time sequence can be established. One example is described in FIG. 4.

Figure 2:
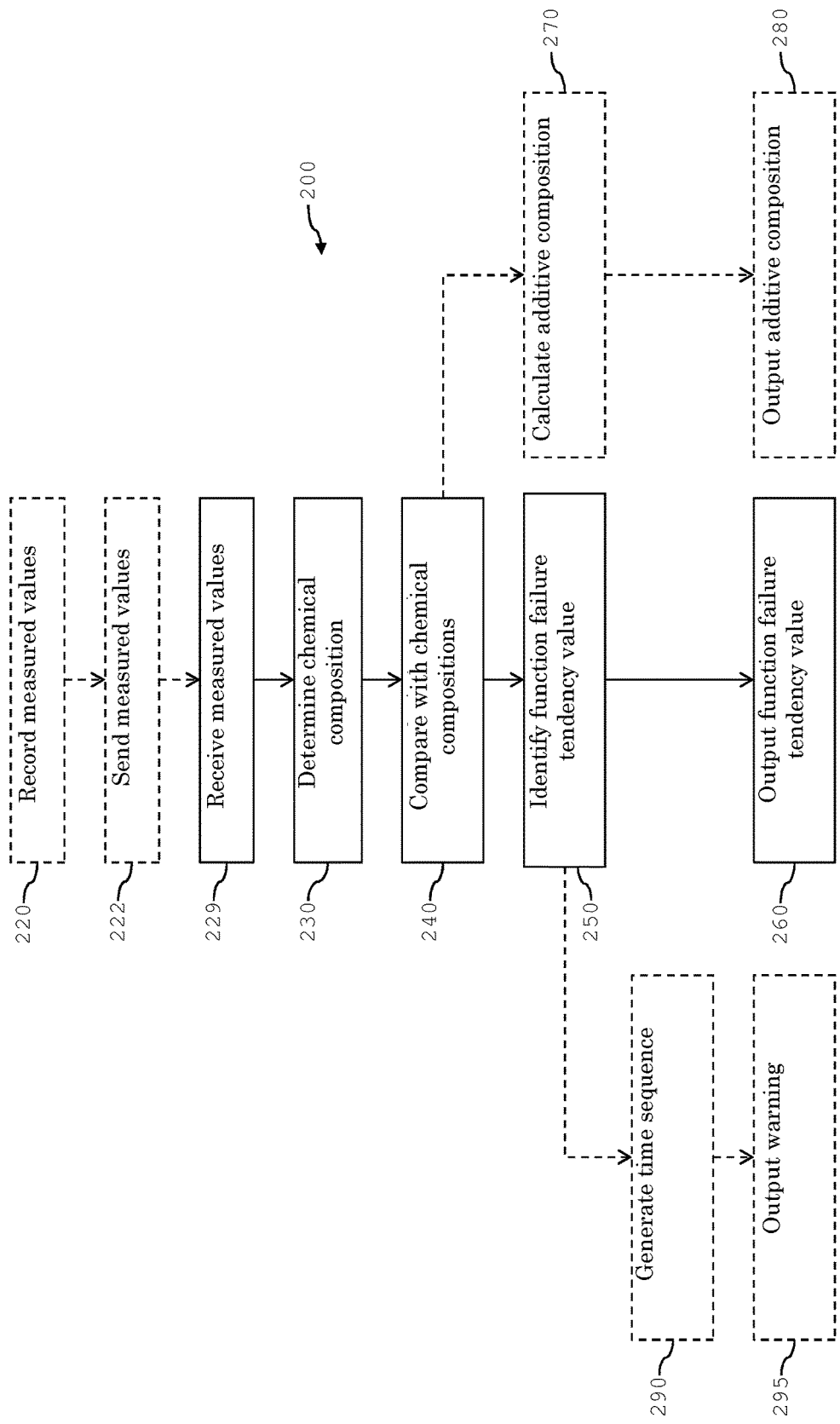
FIG. 2 shows a flow chart for illustrating a method according to the invention.

FIG. 2 shows a flow chart for illustrating a method 200 according to the invention that is implemented at least partially in a computer. Steps shown with dashed lines are optional.

The method 200 comprises the recording 220 of measured values based on sensor data. The sensor data concerns a lubricant that is used for lubricating a machine element. Method 200 further comprises the transmission 222 and the receiving 229 of the measured values. Then the chemical composition of the lubricant based on the measured values is determined 230 and compared 240 with chemical compositions of other known lubricants or the same lubricant at different time points. A function failure tendency value is then identified 250 with the data of the comparison 240 and the function failure tendency value is output 260. Furthermore, a composition for an additive is determined 270 using the data of the comparison, wherein the addition of this additive to the lubricant would change its chemical composition so that the function failure tendency value of the changed chemical composition of the lubricant would indicate a lower failure tendency likelihood and thus an increased service life of the lubricated machine element. The additive composition determined in this way is then output 280. Furthermore, an identified function failure tendency value is input into the generation 290 of a time sequence of multiple function failure tendency values. Based on the time sequence, if the time sequence approaches a threshold, a warning is output 295.

Figure 3:
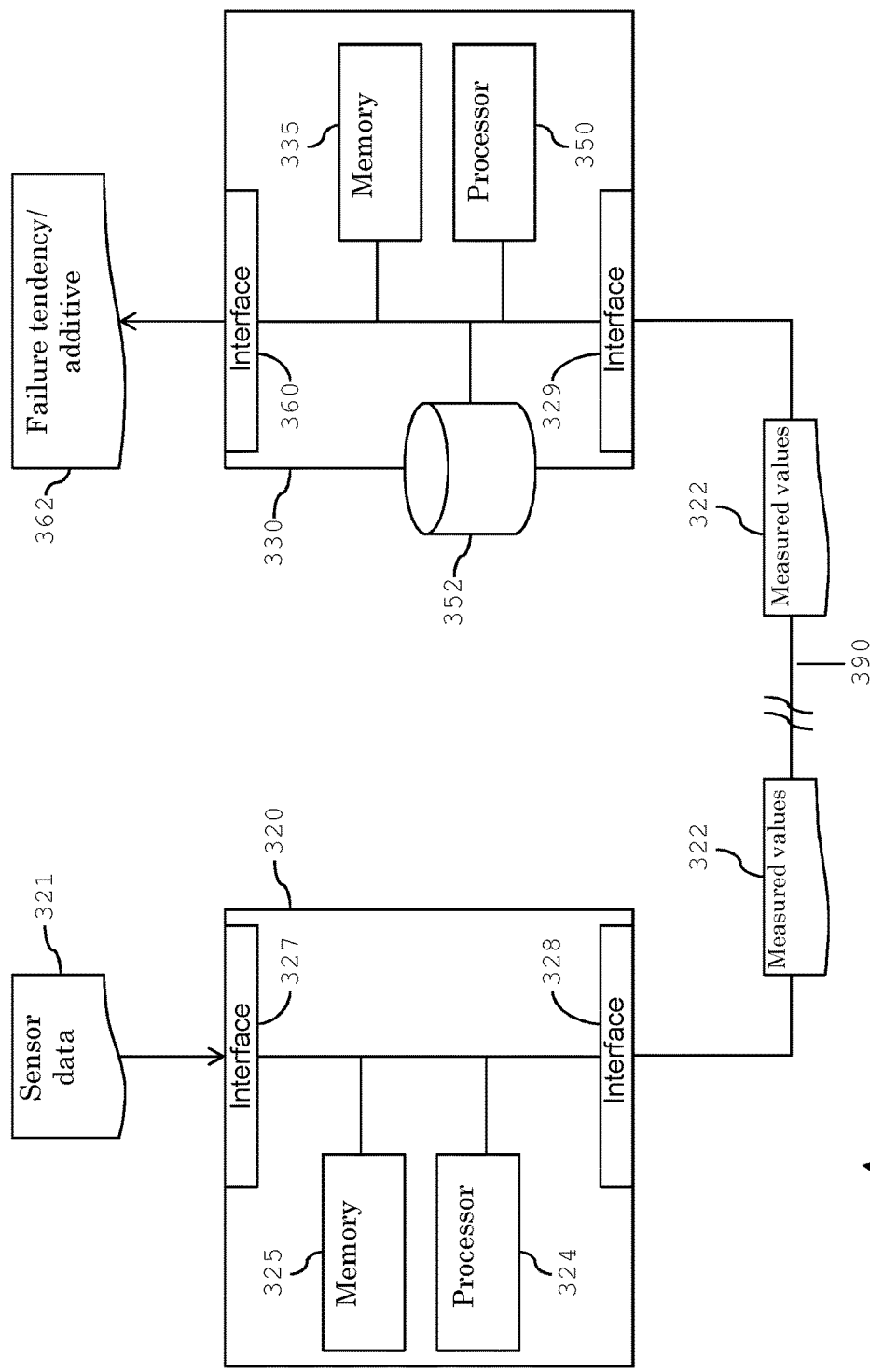
FIG. 3 shows a simple block diagram of the system from FIG. 1.

FIG. 3 shows a simple block diagram of the system 300 from FIG. 1. System 300 for monitoring the function failure tendency of a lubricated machine element comprises a client system 320 and a server system 330, wherein the client system 320 and the server system 330 can exchange data via a data connection 390.

The client system 320 is used for recording measured values 322 concerning a lubricant of a lubricated machine element. The client system 320 here comprises an interface component 327 that is configured for the receiving of sensor data 321. For storing and processing the sensor data 321, data memory components 325 and at least one processor component 324 are part of the client system 320. The processor component 324 is configured for the calculation of the measured values 322 from the sensor data. The calculated measured values 322 are then output via a second interface component 328 and transmitted via a data connection 390 to the server system 330. The receiving and the output of data by the interface components 327, 328 can also be realized via a single interface component.

The sensor data 321 is measured by a sensor that is arranged on the lubricated machine element. Additionally or alternatively, previously taken lubricant samples of the lubricant of the lubricated machine element can also be evaluated for measuring the sensor data.

The server system 330 for monitoring the function of a machine element lubricated with a lubricant comprises a first interface component 329 that is configured for the receiving of measured values 322 concerning the lubricant. The server system 330 further comprises a data memory component 325 for the storing of measured values 322 and at least one processor component 350. The processor component 350 is configured for the determination of a current chemical composition of the lubricant based on the measured values 322 and then a comparison of the current chemical composition (132) with previously known chemical compositions that are stored in a database 352. In the database 352, additional function failure tendency values for the use of lubricants with the previously known chemical compositions in connection with machine elements from previously known materials are stored. The database 352 can be part of the server system 330 or alternatively also placed at a different location and queried via a data connection; this is shown in FIG. 3 with the arrangement of the database 352 on the edge of the server system 330.

The processor component 350 is further configured for the identification of a function failure tendency value 362 based on the determined chemical composition of the lubricant. The server system 330 finally comprises a second interface component 360 that is configured for the output of the function failure tendency value 362 of the lubricated machine element. The receiving and output of data by interface components 329, 360 can also be realized by a single interface component.

The at least one processor component 350 of the server system 330 can be further configured for the generation of a time sequence based on multiple function failure tendency values. The second interface component 360 can further be configured for another output of a warning if the time sequence approaches a previously determined threshold value.

The at least one processor component 350 of the server system 330 can further be configured for the calculation of a characteristic curve, wherein the further output of a warning is carried out based on the approach of the characteristic curve to the previously determined threshold.

The at least one processor component 350 of the server system 330 can further be configured for the calculation of a composition of an additive. The additive can change the current chemical composition of the lubricant of the lubricated machine element with the addition to the current lubricant so that the function failure tendency value of the changed chemical composition of the lubricant indicates a lower function failure likelihood.

The second interface component 360 can be further configured for the output of the data on the composition of the additive.

Figure 4:
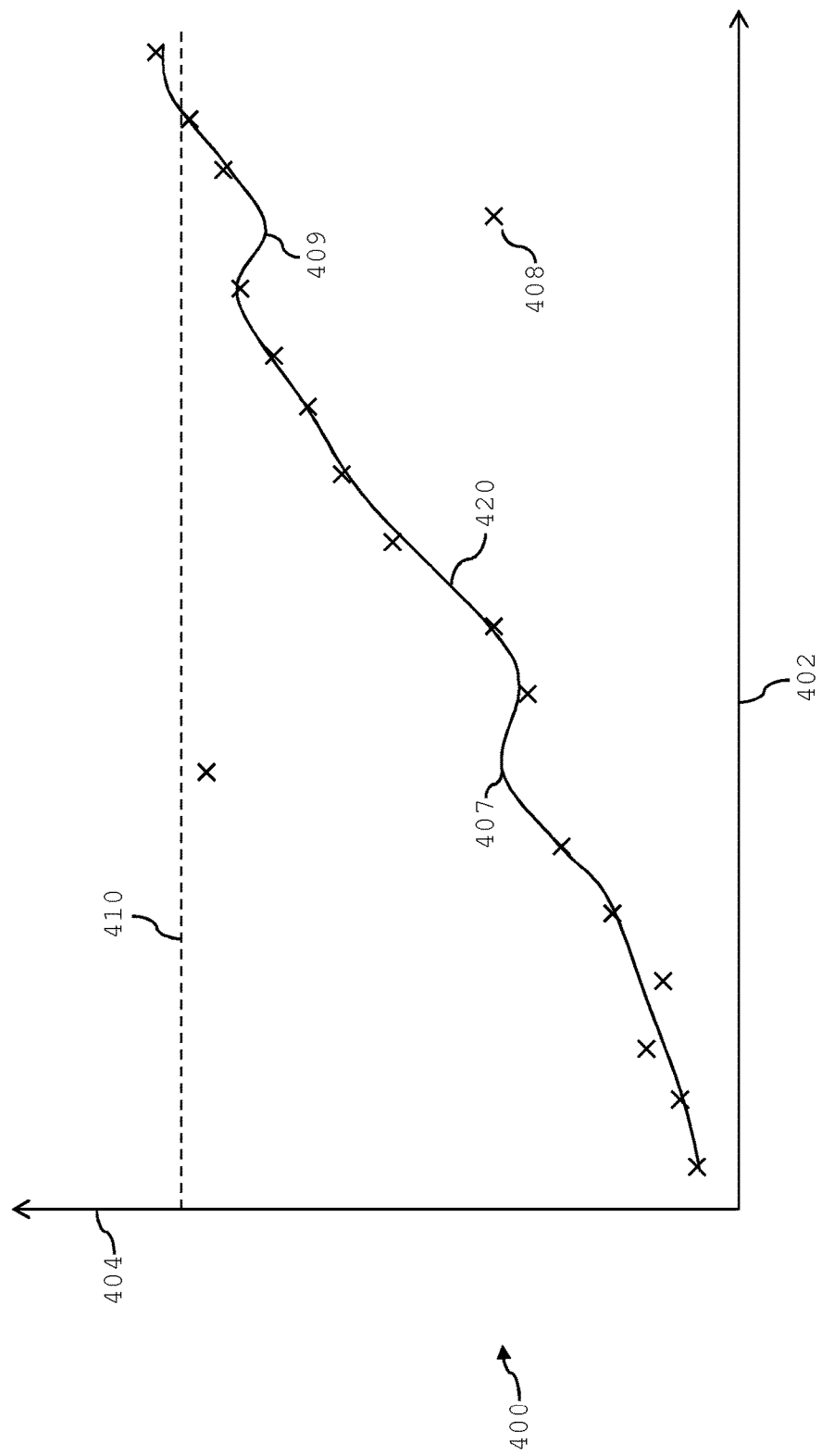
FIG. 4 shows a graph with a time sequence of function failure tendency values.

FIG. 4 shows a graph 400 with a time sequence of function failure tendency values. The x-axis 402 is a time axis. The time axis can symbolize, for example, the operating period of a lubricated machine element. The y-axis 404 shows a range for function failure tendency values. The multiple function failure tendency values are each shown with a cross at time points t_n. The threshold 410 can be previously known, for example, based on experience values for the likelihood for the occurrence of a WEC damage event. Function failure tendency values 406, 408 can be recorded, for example, based on anomalies during the recording of measured values. Characteristic curve 420 compensates for the measured anomalies, as can be seen at 407, 409. If the characteristic curve 410 reaches the threshold or approaches this up to a certain deviation, a warning is output. Alternatively, a warning can be output just for the approach of the function failure tendency value 406.

Graph 400 shows an example of a low number of function failure tendency values. For monitoring during operation of a system, for example, by online monitoring with a sensor that continuously records sensor data directly on the lubricant circuit, a graph can be generated from significantly more function failure tendency values.

Embodiments of the invention can be implemented in the form of digital circuits, computer hardware, firmware, software, or in arbitrary combinations of these parts. The invention can further be implemented in the form of a computer program product, e.g., a computer program on a physical information carrier (e.g., machine-readable storage medium), in order to be executed by a data processing device (e.g., programmable processor, computer, or communications-coupled computer) or to control its operation. A computer program product as claimed can be created in any programming language, wherein also compiled or interpreted languages are included. It can be used in any format, for example, a standalone program, module, component, subprogram, or as a different unit that is suitable for use in a data processing system. The computer program can be executed by a computer or else also by multiple computers connected to each other via a communications network either at one location or distributed over multiple locations. A computer-implemented method can be realized by the execution of corresponding computer program products on corresponding data processing devices.

Method steps according to the invention can be executed by one or more programmable processors through processing of the computer program, in order to realize the functions according to the invention, wherein input data is processed and corresponding output data is generated. The processing steps can also be executed by special logic modules, e.g., field programmable gate arrays (FPGA) or application specific integrated circuits (ASIC).

Examples for processors that are suitable for executing the computer program include general or specialized microprocessors and any single-processor or multiple-processor solution of any digital computer. A processor generally receives instructions and data from a read-only memory (ROM) or random access memory (RAM) or from both. The essential elements of a computer are at least one processor and one or more storage media in order to store data and instructions. A computer is also generally coupled with one or more mass storage media (e.g., magnetic, magneto-optical, optical, or solid state (SSD) storage media) in order to receive data from this media and store data on this media. Such storage media can also be provided on demand or can be reached via the internet (e.g., cloud computing). Suitable data carriers for storing program instructions and data comprise all types of non-volatile memory elements, such as semiconductor elements (e.g., EPROM, EEPROM), flash memory devices, magnetic or magneto-optical storage media, CD-ROM, DVD-ROM, or Blu-ray disks. The processor and storage elements can be supplemented by special logic modules or can also be part of these modules.

To enable the interaction with the user, the invention can be implemented on a computer that comprises at least one output device (e.g., LCD monitor, loudspeaker, etc.) and at least one input device (e.g., keyboard, touchscreen, microphone, pointing device such as a mouse or trackball).

The invention can be implemented on a data processing device that comprises a backend component (e.g., data server) or a middleware component (e.g., application server) or a front end component (e.g., client computer with graphical user interface or web browser), by which the user can interact with an embodiment of the invention or any combination of backend, middleware, and frontend components.

Client computers can also be mobile end devices, for example, smartphones, tablet PCs, or any portable computer device. The components of the system can be coupled with each other by communications (e.g., by a factory communications network such as a local area network (LAN) or wide area network (WAN), internet, or wireless LAN or telecommunications networks).

The computer system can comprise clients and servers. A client and a server are generally physically separated from each other and interact via a communications network. The relationship between client and server is here produced by computer programs that are executed on the corresponding computers and have a client-server relationship with each other.

The invention claimed is:

1. A method for monitoring the function of a machine element lubricated with a lubricant, comprising the following steps:
    arranging a measurement system on the lubricated machine element and circulating the lubricant through a lubricant circuit to the lubricated machine element,
    receiving measured values at the measurement system concerning the lubricant,
    determining a current chemical composition of the lubricant based on the measured values,
    comparing the current chemical composition with previously known chemical compositions that are stored in a database,
        wherein, in the database, function failure tendency values are stored for the use of lubricants with previously known chemical compositions in interaction with machine elements from previously known materials,
    identifying a function failure tendency value based on the comparing step,
    outputting the function failure tendency value,
    generating a time sequence based on multiple identified function failure tendency values,
    outputting of a warning when the time sequence approaches a previously determined threshold value,
    calculating a composition of an additive that is suitable for changing a current chemical composition of the lubricant of the lubricated machine element with the addition of the additive so that a function failure tendency value of the changed chemical composition of the lubricant indicates a lower function failure likelihood, and
    outputting the composition of the additive.

2. The method according to claim 1, wherein the approach of the time sequence to the previously determined threshold is a characteristic curve.

3. The method according to claim 1, the method further comprising:
    transmitting the measured values via a data connection.

4. The method according to claim 3, wherein a spectroscopy records the measured values.

5. The method according to claim 1, further comprising:
    recording the measured values by a measurement system constructed for holding lubricant samples of the lubricated machine element, and
    transmitting the measured values via a data connection.

6. A non-transitory computer readable medium containing computer instructions stored therein for directing a compute processor to perform the steps of the computer-implemented method according to claim 1.

7. The method according to claim 1, further comprising adding the additive to the lubricant.

8. A system for monitoring the function of a machine element lubricated with a lubricant, the system comprising:
    a sensor arranged on the lubricated machine element,
    a first interface component that receives measured values concerning the lubricant from the sensor, a data storage component that stores the measured values,
    at least one processor component that:
        determines a current chemical composition of the lubricant based on the measured values,
        compares the current chemical composition with previously known chemical compositions stored in a database, wherein function failure tendency values for the use of lubricants with previously known chemical compositions in connection with machine elements from previously known materials are stored in the database, and
        identifies a function failure tendency value based on the comparison,
        generates a time sequence based on multiple identified function failure tendency values,
    a second interface component (i) outputs the function failure tendency value, and (ii) output a warning when the time sequence approaches a previously determined threshold value, and
    the at least one processor component calculates a composition of an additive that is suitable for changing a current chemical composition of the lubricant of the lubricated machine element via addition of an additive so that the function failure tendency value of the changed chemical composition of the lubricant indicates a lower function failure likelihood.

9. The system according to claim 8, wherein the at least one processor component calculates a characteristic curve, and wherein the additional output of the warning is carried out based on an approach of the characteristic curve to the previously determined threshold value.

10. The system according to claim 8, wherein the second interface component outputs the composition of the additive.

* * * * *